United States Patent [19]
Richter et al.

[11] 3,876,998
[45] Apr. 8, 1975

[54] ARRANGEMENT FOR THE INDUCTIVE TRANSMISSION OF SIGNALS BETWEEN A STATIONARY POINT AND A ROTATING ELECTRIC MACHINE PART

[75] Inventors: Martin Richter, Marloffstein; Ingo Kroger, Erlangen, both of Germany

[73] Assignee: Siemens Aktiengesellschaft, Munich, Germany

[22] Filed: Sept. 20, 1973

[21] Appl. No.: 399,350

[30] Foreign Application Priority Data
Sept. 28, 1972 Germany............................ 2247718

[52] U.S. Cl............ 340/189 M; 340/213; 340/183; 340/188 CH
[51] Int. Cl. ....................... G08c 15/02; G08c 15/06
[58] Field of Search ............................... 340/189 M

[56] References Cited
UNITED STATES PATENTS

| | | | |
|---|---|---|---|
| 2,685,070 | 7/1954 | Childs | 340/196 |
| 2,836,803 | 5/1958 | White | 340/196 |
| 3,156,910 | 11/1964 | Tarbutton | 340/189 M |
| 3,303,701 | 2/1967 | Matsuuro | 340/189 M |
| 3,387,491 | 6/1968 | Adams | 340/189 M |

Primary Examiner—Thomas B. Habecker
Attorney, Agent, or Firm—Kenyon & Kenyon Reilly Carr & Chapin

[57] ABSTRACT

An improved arrangement for the interference free, inductive transmission of data between a stationary point and a rotating part of an electric machine, which data may be transferred in either direction, comprising two hollow cylindrical structures of non-magnetic material both of which surround the machine shaft and one of which is mounted thereto, the other being mounted to a stationary point with the two cylindrical structures disposed side by side or coaxially and each cylindrical structure having on its surface a plurality of flat coil loops which are side by side and behind each other, the coils of one structure being coupled to means for transmitting signals and those of the other structure to means for receiving whereby data may be transmitted inductively through a gap between the hollow structures.

6 Claims, 4 Drawing Figures

3,876,998

ARRANGEMENT FOR THE INDUCTIVE TRANSMISSION OF SIGNALS BETWEEN A STATIONARY POINT AND A ROTATING ELECTRIC MACHINE PART

BACKGROUND OF THE INVENTION

This invention relates to electric machines in general and more particularly to an improved arrangement for the inductive transmission of data between a stationary point and a rotating machine part.

In larger power generators such as synchronous generators, difficulties arise in attempting to supply the excitation power, which may be several megawatts, through the use of slip rings. Because of this, external pole exciter machines are used along with rotating rectifiers in the synchronous machine. Presently, in order to obtain favorable dynamic characteristics of the machine, revolving thyristors have replaced the rectifiers formerly used. In order to control these thyristors from a stationary control point and, if desired, for feeding back measurement data such as the excitation current, voltage, temperature, etc. from the rotating part or rotor to a stationary monitoring point, a transmission arrangement is required which permits interference free transmission in one, the other or both directions. Naturally such an arrangement would transmit signals without contacts. In addition it should be designed so that it can be installed on or at the shaft of the generator without particular difficulty and that any generator can be retrofitted or modified to have such an arrangement. Such a data transmission arrangement should also function reliably in spite of longitudinal displacement of the machine shaft in the order of 50 mm and radial play of the shaft in the order of ± 5 mm.

SUMMARY OF THE INVENTION

In order to provide such an arrangement, the present invention includes two hollow cylindrical structures of nonmagnetic material which surround the shaft of the machine, with one attached to the shaft for motion therewith and the other secured to a stationary point. The two cylindrical structures are placed side by side or coaxially with each other and have on their surfaces several flat coils in the form of loops side by side or one behind the other with the loop windings of one structure coupled to a transmitting station and the windings of the other structure coupled to receiving system whereby data is transmitted inductively through a gap between the structures.

In order to prevent destruction of the flat coils by the centrifugal forces at high shaft speeds, the flat coils of at least the hollow structures secured to the shaft are mounted to the inside surfaces of this hollow structure. In wiring of the flat coils of the hollow structures, wiring is done in series with adjacent coils having an opposite sense of current direction. To account for axial play in the rotor shaft, the width of the inner space, in which no coil turns are contained, of one structure is made larger or smaller than the corresponding width of the inner space of the flat coils of the other hollow structure. In particular, the width of the inner space is selected to match the longitudinal displacement of the machine shaft with greater spacing or width being provided for larger displacements. For transmitting the data means are provided to modulate the control or measurement data onto the induction loop which serves as the information carrier using frequency or time multiplexing methods in the transmitting means. The signal to be transmitted is provided by a signal transmitter and then fed through a modulator and power amplifier to the transmitting coil. On the receiving side, following the receiving coil, a demodulator and signal evaluator are provided, the latter of which provides a signal on the receiving side corresponding to the signal on the transmitting side and may be used to drive a control or measuring device.

Where simultaneous transmission of data both from and to the rotating part are desired, a pair of transmitting and receiving coil arrangements may be installed. This permits control signals to be transmitted to the rotor and measurement data from the rotor to be transmitted to a stationary monitoring station. The required transmitting and receiving station electronics packages are in modular form and mounted either on or in the machine rotor or near the stator depending on which of the coil containing hollow structures they are associated with. Preferably each of the hollow structures having the flat coils should be divisible at least into halves for modifying or retrofitting preexisting machines and be designed so that they can be clamped around the machine shaft in parts.

DETAILED DESCRIPTION OF THE EMBODIMENT

Figure 1:
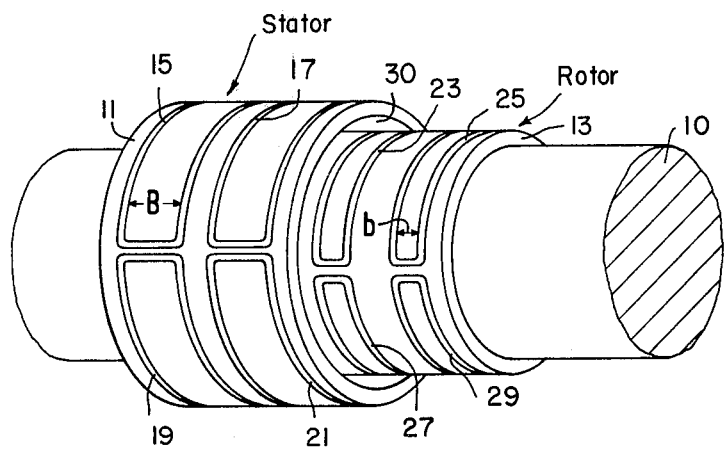
FIG. 1 is a perspective view of the arrangement of the present invention.

As illustrated in FIG. 1, the machine shaft has surrounding it two hollow cylinders 11 and 13 made of a nonmagnetic material. The cylinder 11 will be attached to a stationary point while the cylinder 13 is secured to the shaft 10. Typically the cylinders may be made of a non-magnetic material such as plastic. As illustrated the hollow cylinders 11 and 13 are concentric with the hollow structure 11 surrounding the hollow structure 13. On the surface of each of the hollow structures 11 and 13 are a plurality of flat coils; those associated with the hollow structure 11 designated as 15, 17, 19 and 21 and those on the hollow structure 13 designated 23, 25, 27 and 29. As will be described below, one of the sets of coils is coupled to a transmitting station and the others to a receiving station. Data is thus transmitted inductively through the air gap 30 between the hollow structure 11 and 13. As compared to known rotory transformers whose windings are placed concentrically about the rotating shaft, the coils of the present invention are arranged as flat coils installed in loops with the windings of the transformer coils 15, 17, 19 and 21 and 23, 25, 27 and 29 enclosing the shaft W only partially in segments. Thus at least two each of the windings 15, 17, 19 and 21 and 23, 25, 27 and 29 are required to completely cover the shaft 10. Preferably the flat coils 23, 25, 27 and 29 of the hollow structure 13 mounted on the shaft W should be attached on the inner cylinder surface in order to prevent the destruction of the windings by the centrifugal forces which develop at high speeds. Alternatively if mounted on the outside surfaces, the coils may be wrapped with tape.

Figure 1A:
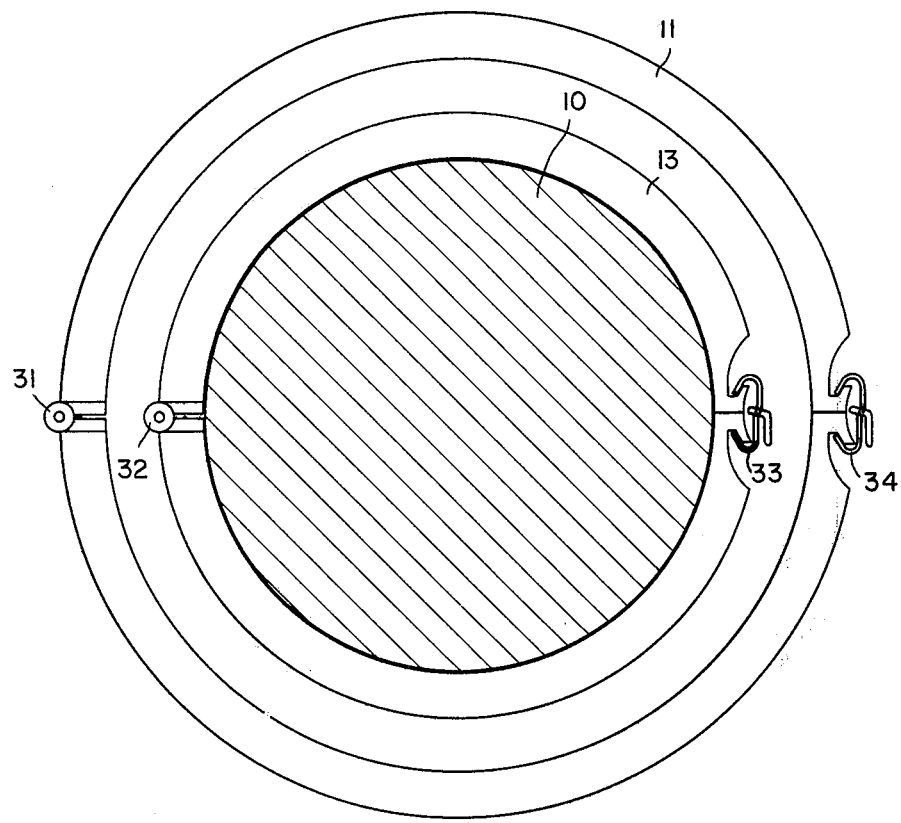
FIG. 1a is an end view of the arrangement of FIG. 1 illustrating the manner in which the hollow structures of the present invention can be divided into halves.

FIG. 1a illustrates the manner in which the hollow structures 11 and 13 can be divided into halves for ease in modifying and retrofitting preexisting machines. Each of the hollow structures 11 and 13 comprise two halves connected together on one end with hinges 31 and 32 respectively. The other side of the cylinder is held together using clamping locks 33 and 34 respectively. Through this arrangement the hollow structures H1 and H2 may be easily inserted and removed for retrofitting, repair and the like.

Figure 2:
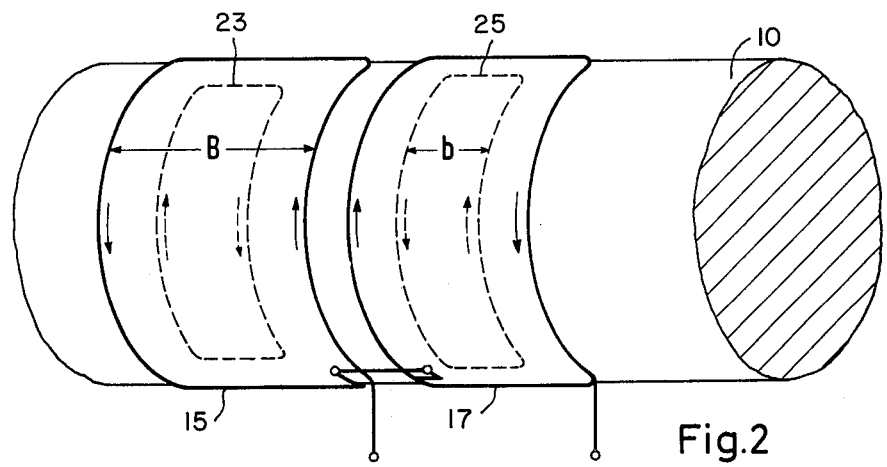
FIG. 2 is a second perspective view illustrating the wiring of the coils and sizing thereof.

As illustrated by FIG. 2, the transmitting coils 15, 17, 19 and 21 and receiving coils 23, 25, 27 and 29 are connected in series with adjacent coils having the opposite sense. This avoids possible interference voltages from an external interference field. Also as shown on FIG. 2, the width B of the innerspace between the two legs of the transmitting coils 15, 17, 19 and 21 should be made larger or smaller than the width B of the innerspace of the receiving coils 23, 25, 27 and 29. This permits maintaining signal transmissions for considerable longitudinal displacements of the machine shaft 10. The arrangement of the windings of the flat coils 15, 17, 19 and 21 and 23, 25, 27 and 29 correspond to that of an air core transformer and the presence of a ferromagnetic shaft 10 is not necessary for the operation of the inductive transmission arrangement.

Tests have shown that with a coil such as that illustrated frequency response over the range of about 100 Hz to 100 MHz is possible. Preferably the hollow structures 11 and 13 should be divisible at least into halves for modifying or retrofitting preexisting machines. They should be designed so that they can be clamped around the machine shaft 10 in part. In that case the coil segments can be mounted to existing machine shafts at a later date without having to make windings at the installation site. The transmission coils 15, 17, 19 and 21 and 23, 25, 27 and 29 can be of identical and interchangable design, so that signal transmission can be obtained as required from the stationary to rotating part or from the rotating part to the stationary part. If data is to be transmitted forward and feed back data transmitted at the same time, then two transmission arrangements each having hollow structures 11 and 13, each equipped with separate coils, should be provided.

Because the winding segments 15, 17, 19 and 21 and 23, 25, 27 and 29 surround the shaft completely in pairs which are situated one behind the other, data transmission without laspe is insured for any angle of rotation of the shaft 10 even if the machine is at a standstill.

Figure 3:
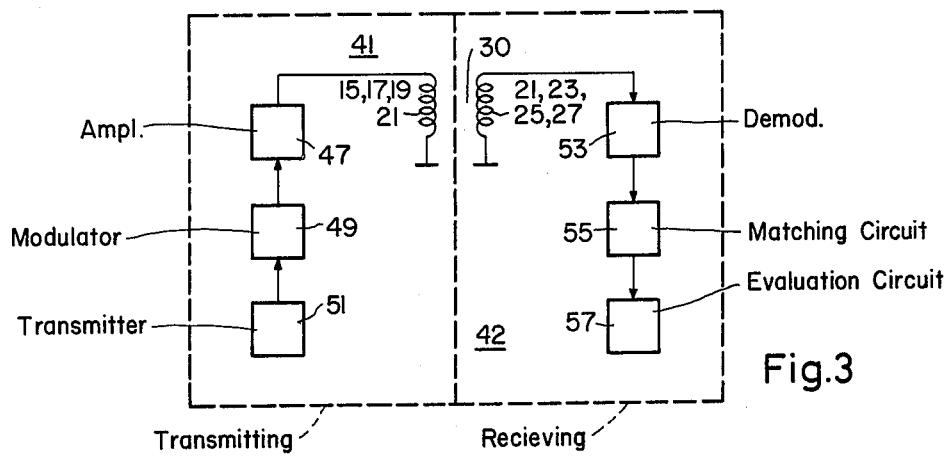
FIG. 3 is a block diagram showing the typical circuit which may be used with the arrangement of the present invention.

A typical circuit arrangement for data transmission is illustrated by FIG. 3. Control data, for example data corresponding to the control signals needed to fire the thyristors rotating in the machine, is transmitted from a stationary transmitting station 41 to the rotating receiving station 42. Signals are provided by a signal transmitter 51 to a modulator 49 wherein frequency or time multiplexing is accomplished permitting several sets of information to be transmitted simultaneously through the gap 30 between the transmission elements 11 and 13. The modulator output is amplified by an amplifier 47 before being provided to the coils SSP. The receiving coils 23, 25, 27 and 29 receive the signals which are then demodulated in a demodulator 53 and then fed through a matching circuit 55 to a signal evaluator 57 which provides outputs to the control units [not shown] for the thyristors to be controlled. Preferably the demodulating and evaluating circuits required in the receiving unit will be placed in modular packages and mounted on or in the machine shaft 10.

For the purpose of transmitting data from the rotor to a stationary measuring and receiving point, transmitting devices similar to those described above will be located in or on the shaft and will comprise a signal transmitter, a modulator, and a power amplifier. Again information flow can be increased through the use of frequency or time multiplexing. Thus in addition to transmitting control signals to the rotor, measurement data regarding current voltage, temperature, vibrations, etc. can be fed back to a stationary measurement-data receiving point. Thus an improved inductive transmission system for transmitting signals between a stationary point and a rotating machine part has been shown. Although specific embodiments have been illustrated and described it will be obvious to those skilled in the art that various modifications may be made without departing from the spirit of the invention which is intended to be limited solely by the appended claims.

What is claimed is:

1. Apparatus for the inductive transmission of data between a stationary point and a rotating electrical machine part comprising:
  a. a first hollow cylindrical structure of nonmagnetic material surrounding and secured to the shaft of the machine and containing thereon a first set of at least two flat coils in loops arranged one behind the other around the circumference of the structure and a second set of at least two flat coils located beside said first set and also arranged around the circumference of said structure one behind the other;
  b. a second hollow cylindrical structure of nonmagnetic material concentric with the shaft and disposed coaxially with respect said first hollow cylindrical structure and attached to a stationary point, an annular air gap being formed between said first and second structures, said second hollow cylindrical structure having on its surface a third set of at least two flat coils arranged in loops one behind the other around the circumference of said structure and a fourth set of at least two flat coils arranged in loops one behind the other around the circumference of said structure beside said third set;
  c. transmitting means coupled to one of said first and second sets of coils on said first hollow cylindrical structure and said third and fourth sets of coils on said second hollow cylindrical structure; and
  d. receiving means coupled to the other said sets of coils.

2. The invention according to claim 1 wherein on at least one of said first and second hollow cylindrical structures said flat coils are applied to the inside surface.

3. The invention according to claim 1 wherein adjacent flat coils on said first and second hollow cylindrical structures are connected in series opposition.

4. The invention according to claim 1 wherein the width of the inner space between legs of said flat coils of one said first and second hollow cylindrical structures is larger than the corresponding width in the other of said hollow structures.

5. The invention according to claim 4 wherein said width is matched to the longitudinal displacement of the machine shaft with said width being larger the larger the displacement is.

6. The invention according to claim 1 wherein each of said first and second hollow structures is divisible at least into halves thereby permitting the modification or retrofitting of a pre-existing machine.

* * * * *